(12) United States Patent
Takahashi et al.

(10) Patent No.: US 6,403,041 B1
(45) Date of Patent: Jun. 11, 2002

(54) REACTION VESSEL HAVING AN OXYGEN PERMEABLE MEMBRANE

(75) Inventors: Tomonori Takahashi, Chita; Manabu Yoshida, Bisai, both of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/153,693

(22) Filed: Sep. 15, 1998

(30) Foreign Application Priority Data

Sep. 25, 1997 (JP) .............................................. 9-259695

(51) Int. Cl.⁷ ................................................ B01J 12/00
(52) U.S. Cl. ........................ 422/240; 422/239; 422/312; 95/54
(58) Field of Search ................................ 422/312, 239, 422/240; 95/54; 48/DIG. 5

(56) References Cited

U.S. PATENT DOCUMENTS

| | | | | |
|---|---|---|---|---|
| 1,685,759 A | * | 9/1928 | Walter ........................ | 423/468 |
| 5,306,411 A | | 4/1994 | Mazanec et al. ............ | 204/265 |
| 5,573,737 A | * | 11/1996 | Balachandran et al. ..... | 422/211 |
| 5,599,383 A | * | 2/1997 | Dyer et al. ...................... | 96/8 |
| 5,846,641 A | * | 12/1998 | Abeles et al. ............ | 428/312.8 |
| 5,935,533 A | * | 8/1999 | Kleefisch et al. ............ | 422/211 |
| 5,972,079 A | * | 10/1999 | Foley et al. .................... | 96/11 |
| 5,980,840 A | * | 11/1999 | Kleefisch et al. ............ | 422/211 |

* cited by examiner

*Primary Examiner*—Jerry D. Johnson
*Assistant Examiner*—Frederick Varcoe
(74) *Attorney, Agent, or Firm*—Burr & Brown

(57) ABSTRACT

A reaction vessel including an oxygen-containing gas chamber separated from a source gas chamber by an oxygen-permeable membrane that allows oxygen selectively to pass therethrough to contact and react with source gas contained in the source gas chamber. The ratio of at least one of (i) the volume of the oxygen-containing gas chamber to the total volume of the vessel and (ii) the volume of the source gas chamber to the total volume of the vessel, is outside a range within which explosion would occur if the oxygen-containing gas and source gas were allowed to combine directly. Preferably, the ratio also is outside a range within which explosion would occur if the oxygen-containing gas and products resulting from reactions between oxygen supplied through the oxygen-permeable membrane and the source gas were allowed to combine directly. The vessel is safer to operate in that the risk of explosion, due to direct mixing of the gases when the oxygen-permeable membrane is damaged or cracked, is greatly reduced.

17 Claims, 2 Drawing Sheets

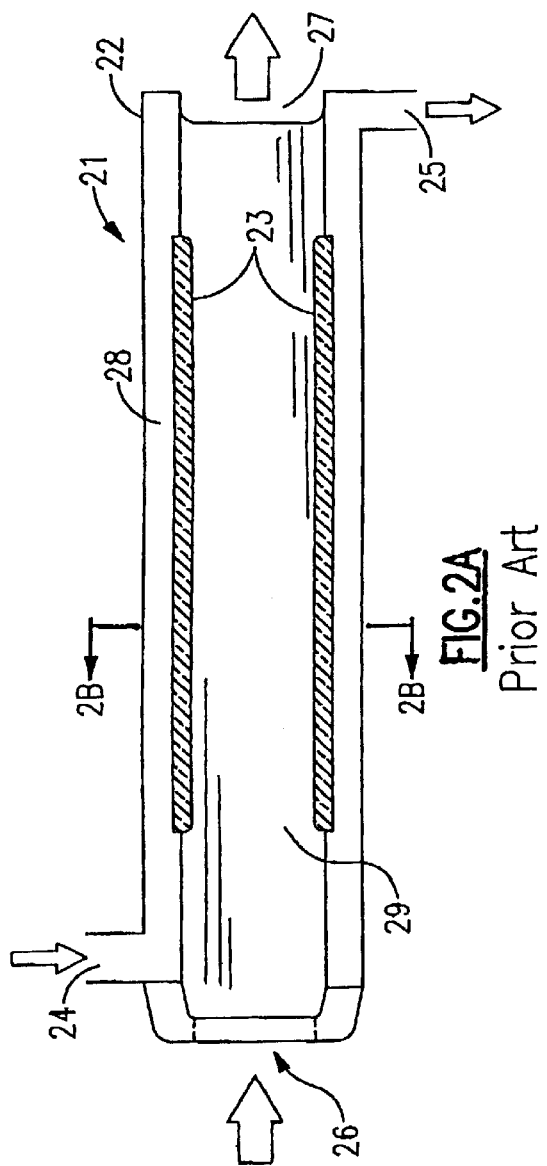
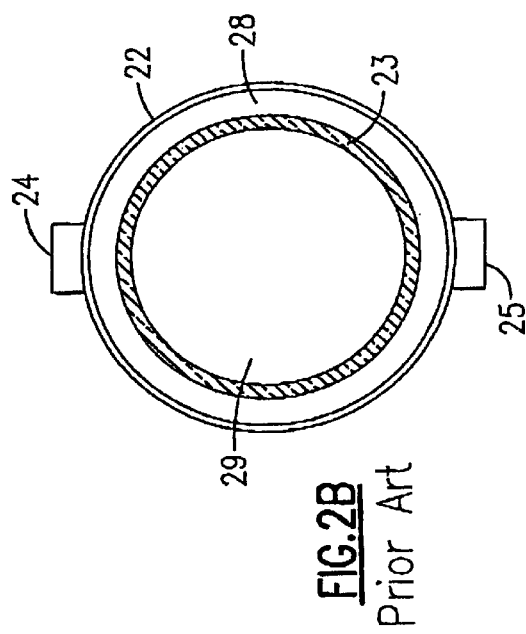
FIG.2A
Prior Art
FIG.2B
Prior Art

REACTION VESSEL HAVING AN OXYGEN PERMEABLE MEMBRANE

FIELD OF THE INVENTION

The present invention relates to a membrane-type reaction vessel which facilitates oxygen reactions using an oxygen-permeable membrane that allows oxygen, from oxygen-containing gas, to pass therethrough selectively.

BACKGROUND OF THE INVENTION

An oxygen-permeable membrane is a semipermeable membrane which allows oxygen to pass therethrough selectively depending upon the partial pressure of oxygen on opposite sides of the membrane. The membrane typically consists of a solid electrolyte that conducts oxygen ions, and examples of such materials include yttrium-stabilized zirconia (YSZ), calcia-stabilized zirconia, and bismuth oxide.

It is also possible to create an oxygen-permeable membrane with a mixed conductor which conducts both oxygen ions and electrons, instead of a solid electrolyte which conducts ions only. For example, YSZ containing titanium and compounds with a Perovskite structure, such as La—Sr—Co—O, La—Sr—Co—Fe—O and Sr—Co—O, are known.

The use of such oxygen-permeable membranes for oxygen isolation equipment or chemical reaction equipment has become popular recently. For example, U.S. Pat. No. 5,306,411 discloses an electrochemical reactor including a solid membrane made of mixed metal oxides having a Perovskite structure (i.e., a mixed conductor). The solid membrane is used as an electrochemical transportation mechanism for moving oxygen from an oxygen-containing gas to a source gas, to remove oxygen from oxygen-containing compounds, to allow for aromatic compound substitution, and/or to allow for partial oxidation reactions of methane and ethane.

Japanese Patent Application No. JP-A-7-138191 also discloses a membrane reactor which facilitates an oxidative coupling reaction of methane, by using Perovskite-structured oxides such as Sr—Co—Li—O and Sr—Co—Mg—O as membrane compounds.

The reaction vessels described above provide superior selectivity of reaction in comparison to vapor phase reaction vessels, which were commonly used to facilitate such reactions. There are, however, problems that need to be solved so as to allow safe operation of such vessels.

FIGS. 2A and 2B show one example of a reaction vessel known in the prior art. The reaction vessel 21 includes a vessel wall 22 defining an oxygen-containing gas chamber 28 and a source gas chamber 29. These two chambers are separated hermetically by an oxygen-permeable membrane 23. Oxygen-containing gas inlet 24 and outlet 25 allow gas to flow through chamber 28. Source gas inlet 26 and outlet 27 allow gas to flow through chamber 29.

There is a concern that, in the case of damage (e.g., cracking) to the oxygen-permeable membrane 23, a large volume of oxygen-containing gas, which is confined in oxygen-containing gas chamber 28 only by oxygen-permeable membrane 23, will flow into source gas chamber 29, or conversely, that a large volume of source gas will flow into oxygen-containing gas chamber 28. In such cases of large gas volume, there is a danger that the two gases mixed together will react rapidly and result in explosion.

SUMMARY OF THE INVENTION

It is an object of the present invention to provide a reaction vessel that is safer to operate and has a lower possibility of explosion even in the event of cracking of or damage to the oxygen-permeable membrane.

In accordance with one embodiment of the present invention, the membrane-type reaction vessel is divided into an oxygen-gas containing chamber and a source gas chamber via an oxygen-permeable membrane which is selectively permeable to oxygen. The vessel is designed so as to allow oxygen from the oxygen-containing gas to pass through the oxygen-permeable membrane to contact and react with source gas in the source gas chamber. The volume ratio between the source gas chamber and the oxygen-containing gas chamber is designed to be outside the range within which the two gases, if combined directly, would result in explosion. Preferably, the volume ratio between the two gas chambers is also designed to be outside the range within which an explosion would result from directly combining the oxygen-containing gas and reaction products resulting from the reaction between oxygen that has already permeated through the oxygen-permeable membrane and the source gas.

In a more preferred embodiment of the present invention, the volume ratio of the oxygen-containing gas chamber with respect to the total volume ($V_T$) of the reaction vessel (i.e., the volume ($V_O$) of the oxygen-containing gas chamber and the volume ($V_S$) of the source gas chamber) should be less than 50%, more preferably less than 30%, and most preferably less than 10%.

In accordance with another preferred embodiment of the present invention, a filler is disposed in the oxygen-containing gas chamber and/or the source gas chamber to adjust the volume of those chambers relative to each other. The filler preferably is one of a metal, ceramic or glass, all of which are inert with respect to the oxygen-containing gas, the source gas and reaction products resulting from reactions between oxygen supplied from the oxygen-containing gas and the source gas.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which:

FIG. 2A is a longitudinal cross-sectional view of a prior art reaction vessel; and FIG. 2B is a cross-sectional view taken through line IIB—IIB of FIG. 2A.

DETAILED DESCRIPTION OF THE PREFERRED EMBODIMENT

Figure 1A:
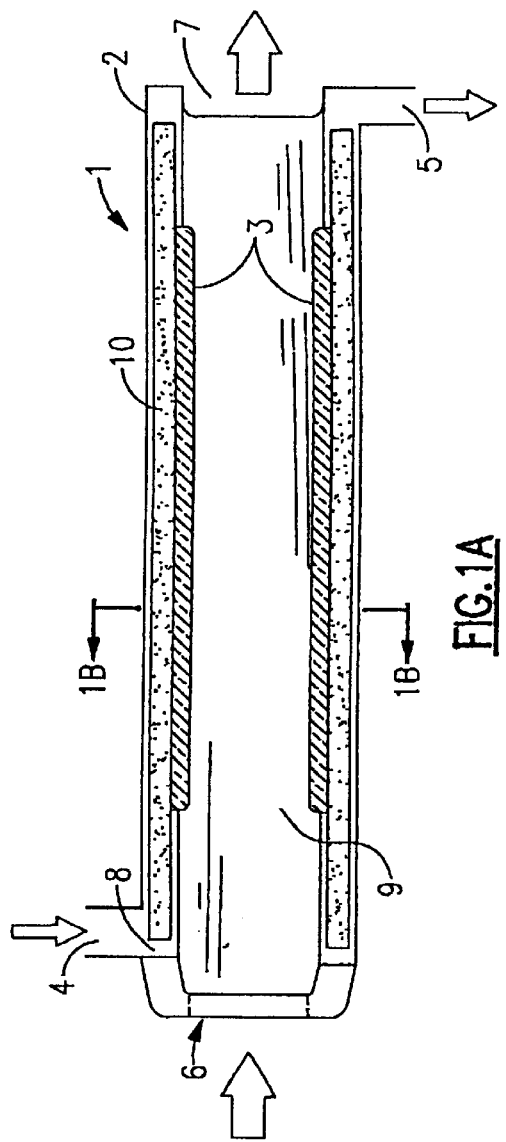
FIG. 1A is a longitudinal cross-sectional view of a reaction vessel in accordance with the present invention.

FIG. 1A is a longitudinal cross-sectional view of a reaction vessel in accordance with the present invention. The reaction vessel 1 includes a vessel wall 2 defining an oxygen-containing gas chamber 8 and a source gas chamber 9. These two chambers are separated by an oxygen-permeable membrane 3. Oxygen-containing gas inlet 4 and outlet 5 allow oxygen-containing gas to flow through chamber 8. Source gas inlet 6 and outlet 7 allow source gas to flow through chamber 9. A filler 10 is disposed within oxygen-containing gas chamber 8 to adjust the volume ($V_O$) of that chamber with respect to the total volume ($V_T$) of the vessel.

The reaction vessel of the present invention employs oxygen-permeable membrane 3 to allow selective permeation of oxygen from oxygen-containing gas flowing through chamber 8 into source gas chamber 9 to allow oxygen to react with source gas. The oxygen-containing gas and the source gas are supplied continuously to chambers 8 and 9 respectively, to provide a continuous reaction between oxygen permeating through membrane 3 and the source gas present in chamber 9.

As for the source gas, hydrocarbons such as methane, ethane and aromatic compounds can be used. Each of these source gases can be made available for partial oxidation reactions and aromatic compound substitution reactions. It is also possible to use the source gas to remove oxygen from oxygen-containing gases supplied to chamber 8.

As for the oxygen-containing gas, oxygen itself can of course be used alone or mixed with other gases such as air or oxygen-containing compounds such as sulphur oxide compounds, hydrogen oxide compounds, water vapor, carbon dioxide and the like. These latter gases can also be used alone.

Oxygen-permeable membrane 3 can be any type of membrane capable of selective permeation of oxygen. Solid electrolytes such as yttrium-stabilized zirconia, calcia-stabilized zirconia, and bismuth oxide, or mixed conductors having Perovskite structures such as La—Sr—Co—O, La—Sr—Co—Fe—O, Sr—Co—O and Ca—Co—Fe—O, can be used. It is preferred to use mixed conductors in cases where electrodes are not present in the reaction chamber.

As for the shape of the oxygen-permeable membrane 3, it is preferred to use tubes or plates as long as the membrane can divide the source gas chamber from the oxygen-containing gas chamber. While only a single tube-shaped reaction vessel is shown in the drawings, it is preferred to use a plurality of vessels in order to provide sufficient membrane area to carry out efficient reaction between the oxygen supplied from the oxygen-containing gas and the source gas flowing in source gas chamber 9.

The oxygen-permeable membrane can be formed using any known compounds by any known method. For example, powdered or slurried compounds such as those described above can be formed by pressing, extrusion, doctor blading, casting, spray coating, and the like, all followed by appropriate heat treatments to provide desired shapes. It is preferred, however, to form a thin membrane of oxygen ion conductor material by sputtering or chemical vapor deposition of the oxygen ion conductor material on a porous substrate. This allows for the formation of a very thin membrane which will ensure large volume transport of oxygen therethrough. The membrane should not be so thin that the possibility of gas leaks arise. Preferably, the thickness of the membrane is about 1–80 microns. While the material for the porous substrate is not limited, alumina, magnesia, Perovskite compounds and metals are preferred.

As for the material of the reaction vessel, any material can be used as long as it is resistant to pressure, heat and corrosion. Metals such as SUS and glass are examples of materials that meet these criteria. The overall shape of reaction vessel 1 should resemble that of membrane 3. For example, a double-layer tubular structure that includes a tubular oxygen-permeable membrane disposed inside a cylindrical reaction wall 2 is one example of a structure that the reaction vessel can take. It is, of course, possible to have a plurality of tubular oxygen-permeable membranes disposed within a single reaction wall 2, such that a common plenum is defined for the oxygen-containing gas chamber and a plurality of source gas chambers are defined within each tubular oxygen-permeable membrane.

Regardless of the overall construction of the reaction vessel, oxygen-permeable membrane 3 must provide a hermetic seal between oxygen-containing gas chamber 8 and source gas chamber 9. As described above, each of the oxygen-containing gas and source gas chambers includes appropriate inlets and outlets to provide a constant supply of oxygen-containing gas and source gas, respectively. The reaction products resulting from the reaction between oxygen and source gas are removed from the reaction vessel along with any unreacted source gas through outlet 7 of source gas chamber 9.

In accordance with the present invention, the volume ratio between source gas chamber 9 and oxygen-containing gas chamber 8 must be outside the range within which the two gases, if mixed directly, would result in explosion. This explosive range will obviously vary depending upon the oxygen-containing gas and source gas used, so that the reaction vessel must be designed and dimensioned based upon the specific types of gases that are to be used in the reaction vessel. By so dimensioning the chambers in the reaction vessel, the chance of explosion is reduced substantially because the volume of oxygen-containing gas, for example, present in the reaction vessel at any given time is outside the range within which explosion would result if the two gases were combined directly as result of damage to the oxygen-permeable membrane.

As used herein, the explosion threshold refers to a threshold value at which a direct mixture of source gas and oxygen-containing gas will result in explosion. Generally speaking, this threshold value is defined using upper and lower limits of the volume of the source gas with respect to the total volume of the source gas plus the volume of the oxygen-containing gas. Consequently, the volume ratio between the source gas chamber and total volume of the vessel should be below the lower limit value or above the upper limit value for the specific oxygen-containing gas and source gas being used. For example, when methane is used as the source gas and air is used as the oxygen-containing gas, and the lower and upper limit values in this case are 5% and 15%, respectively, the volume ratio for the source gas chamber with respect to the volume ratio of the overall vessel should be less than 5% or greater than 15% in order to be outside the threshold range of explosion. That is, $5\% < V_S/V_T < 15\%$ (where $V_T = V_S + V_O$) defines the threshold range of explosion.

The threshold range for explosion depends upon the difference in pressure between the two chambers, as well as the temperatures and partial pressures in the two chambers. Usually the threshold ranges are determined by experimentation. The threshold range for explosion becomes wider when temperature and/or pressure are high. For example, the range for methane is 3–20% at 700° C.

Additionally, the oxygen concentration in the mixed gas must exceed certain limits before an explosion will occur. For example, propane does not form an explosive mixed gas when oxygen concentration is not more than 10%. Therefore, the concentration should be low, i.e., the volume of oxygen containing gas should be low.

In addition to the above, when the speed at which the reaction products are generated is fast, or the speed at which the source gas is injected is slow, the reaction products have a tendency to reside at the source gas chamber-side of the oxygen-permeable membrane. Accordingly, consideration must also be given as to the explosion threshold of the reaction products if allowed to mix directly with the oxygen-containing gas.

Generally speaking, the explosion threshold value follows Le Chatelier's law, as stated at (1) below. It is possible to reduce the chance of explosion by setting the volume ratio of the source gas chamber to be outside the threshold range within which explosion would occur if the oxygen-containing gas were allowed to mix directly with the source gas and/or products of the reaction between oxygen and the source gas.

$$L=100/((n1/L1)+(n2/L2)\ldots) \qquad (1)$$

wherein

L: explosion limit value of mixed gas (%), n1: volume ratio of the first element of mixed gas (%), L1: explosion limit value of the first element of mixed gas (%), n2: volume ratio of the second element of mixed gas (%), and L2: explosion limit value of the second element of mixed gas (%).

In the example of methane and air as mentioned above, the reaction product is ethane (and water). If the lower limit value of ethane is 3% and the upper limit is 12.5%, the volume ratio of the source gas chamber must be less than 3% (the explosion lower limit value for ethane) or greater than 15% (the explosion upper limit value for methane). That is, $3\%<V_S/V_T<15\%$ defines the threshold range of explosion.

It is possible to set the volume ratio of the chambers either below or above the lower and upper limits described above. However, the following table shows that the explosion threshold limit of saturated hydrocarbons such as methane and ethane, and aromatic compounds such as benzene and toluene, which are typically used as source gases in reaction vessels, lean extremely towards the source gas low concentration side. That is, it is difficult to keep the volume ratio of the source gas chamber lower than the explosion threshold lower limit value, because gases such as those described above have small permissible deviations at the lower limit value side. Conversely, it is relatively easy to set the volume ratios to be above the upper explosion threshold limit value.

TABLE 1

| | Flammable Gases | | Explosion Limit* (vol %) | |
|---|---|---|---|---|
| | Name | Chemical Formula | Lower Limit | Upper Limit |
| Saturated hydrocarbons | Methane | $CH_4$ | 5.00 | 15.00 |
| | Ethane | $C_2H_6$ | 3.00 | 12.50 |
| Unsaturated hydrocarbons | Ethylene | $C_2H_4$ | 2.75 | 28.60 |
| Aromatic hydrocarbons | Benzene | $C_6H_6$ | 1.40 | 7.10 |
| | Toluene | $C_6H_5CH_3$ | 1.27 | 6.75 |

*Under atmospheric pressure and room temperature using air as the oxygen-containing gas.

In the membrane reaction vessel of the present invention, movement of oxygen through oxygen-permeable membrane 3 determines the rate at which the reaction will occur between oxygen passing therethrough and the source gas present in source gas chamber 9. The chemical reaction between the oxygen and the source gas occurs on the source gas chamber-side of oxygen-permeable membrane 3. Accordingly, the volume ratio of source gas chamber 9 itself has no real impact on the speed at which the reaction takes place. Therefore, as long as oxygen-containing gas and source gas are continuously provided through chambers 8 and 9, respectively, the volume ratio of source gas chamber 9 can be set to any level desirable without any reference to the lower or upper explosion limit values discussed above. The volume ratio of the oxygen-containing gas chamber, however, must be set so as to avoid the range within which explosion would occur if the two gases (or the oxygen and the reaction products) were allowed to mix directly.

In view of the above, it is preferred to use a relatively small volume ratio in the oxygen-containing gas chamber. Preferably, the volume ($V_O$) of the oxygen-containing gas chamber is less than 50% of the total volume ($V_T$) of the vessel itself, more preferably less than 30%, and most preferably less than 10%. The size of the oxygen-containing gas chamber is limited only by its ability to provide enough oxygen to the oxygen-permeable membrane to provide efficient reaction with the source gas.

In the case of saturated hydrocarbons such as methane and ethane, and aromatic compounds such as benzene and toluene, use of an oxygen-containing gas chamber having a volume ratio of less than 50% should provide for safe operation since 50% is far less than what would be required to result in explosion in the event the oxygen-permeable membrane cracks or breaks. This safety measure is ensured even further by making the volume ratio of the oxygen-containing gas chamber less than 30%, most preferably less than 10%. This more preferred range also ensures that only a relatively small amount of oxygen is ever present at any given time within the reaction vessel. Other factors such as temperature and pressure, must also be taken into account when designing the vessel as those factors will affect the efficiency of reaction.

Figure 1B:
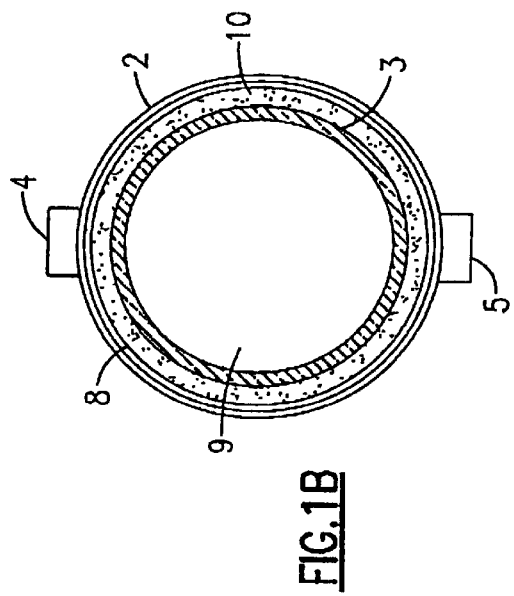
FIG. 1B is a cross-sectional view taken through line IB—IB of FIG. 1A.

There are many methods by which the volume ratio of the oxygen-containing gas chamber can be set to 50% or less with respect to the total volume of the reaction vessel. One method would be to select the volume of the source gas chamber and then appropriately size the volume of the oxygen-containing gas chamber to be less than 50% of the overall volume of the vessel. This will avoid the chance of explosion during operation of the vessel, and will also reduce the overall size of the vessel. Another method is as shown in FIGS. 1A and 1B, wherein a filler 10 is inserted in oxygen-containing gas chamber 8. As explained above, filler 10 must be of a material that is inert to the oxygen-containing gas. This method allows for an existing reaction vessel to be retroactively fitted so that the volume of the oxygen-containing gas chamber is less than 50% of the total volume of the reaction vessel.

It is also possible to add filler to the source gas chamber in addition to or separately from the filler added to the oxygen-containing gas chamber in order to set the volume ratio of the chambers to be outside the explosion threshold limit range discussed above.

When used in the oxygen-containing gas chamber, the filler must be of a material that is inert to the oxygen-containing gases that will be introduced into that chamber. The same is true when used in the source gas chamber, in that the material must be inert to all source gases that will be introduced into that chamber. Metals such as stainless steel, ceramics such as alumina, and glasses such as crystallize glass can be used in either chamber, and can take any necessary shape such as a helical inserts, a plurality of rod-shaped longitudinally extending members, and the like.

This also leaves open the option of customizing reaction vessels to handle various different oxygen-containing and source gases. For example, the explosion limit values of an air/methane mixture are different from the explosion limit values of an air/benzene mixture. Accordingly, different sized fillers could be added to the oxygen-containing gas chamber and/or the source gas chamber in order to ensure that the volume ratios of the chambers are outside the explosion limit value of the particular gases being used.

EXAMPLES

The invention will now be explained in detail with reference to specific examples, it being understood, however, that the invention is not limited to these examples.

Example 1

Lanthanum oxide, strontium carbonate and cobalt oxide are mixed at a mole ratio of 0.2:0.8:1, and then heated to 1,000° C. to produce $La_{0.2}Sr_{0.8}CoO_{3-x}$ powder. A 67% slurry is then prepared using 40 g of the powder mixed with 20 g of ethanol. The slurry is then coated on the outside of a tubular porous alumina substrate having an outside diameter of 8 mm and an inside diameter of 5 mm, a length of 150 mm, and a porosity of 30%. The coated tube is heat treated at 1,200° C. to provide a tubular oxygen-permeable membrane.

The oxygen-permeable membrane is then loaded inside a glass tube having an outside diameter of 13 mm and an inside diameter of 10 mm, thereby creating a double-layer tubular reaction vessel such as shown in FIGS. 1A and 1B. A glass seal is used to bond the tubular membrane and glass tube to provide oxygen-containing gas and source gas chambers hermetically sealed from one another. The cylindrical space between the inside of the glass tube and the outside of the tubular membrane serves as the oxygen-containing gas chamber and the inside of the tubular membrane serves as the source gas chamber.

The volume of the source gas chamber 9 is 4.3 cm³ and the volume of the oxygen-containing gas chamber 8 is 4.2 cm³, such that the volume ratio of the source gas chamber 9 is about 50% (i.e., $V_S/V_S+V_O \approx 50\%$).

Comparative Example 1

The same procedure as in Example 1 is followed to create a double-layer tubular reaction vessel, except that the glass tube had an outside diameter of 23 mm and inside diameter of 20 mm. The volume of source gas chamber 9 is 4.3 cm³ and the volume of oxygen-containing gas chamber 8 is 40 cm³, such that the volume ratio of the source gas chamber is about 10% (i.e., $V_S/V_S+V_O \approx 10\%$).

Example 2

In the reaction vessel of Comparative Example 1, a porous alumina tube 10 having a porosity of 30% is added to oxygen-containing gas chamber 8, as shown in FIGS. 1A and 1B. The volume of oxygen-containing gas chamber 8 is reduced to 12 cm³, such that the volume ratio of the source gas chamber is about 26% (i.e., $V_S/V_S+V_O 26\%$).

Incidentally, when the same porous material 10 was added to chamber 8 of the reaction vessel of Example 1, the volume of oxygen-containing gas chamber 8 is 1.3 cm³, such that the volume ratio of the source gas chamber is about 78%.

Evaluation:

Each of the above-mentioned reaction vessels was placed inside a tubular electric furnace and the temperature was controlled as methane gas (the source gas) was supplied inside chamber 9 at a rate of 100 ml/min, and ambient atmosphere was supplied to chamber 8 at a rate of 100 ml/min. The reaction was allowed to proceed for five hours under normal pressure at a temperature of 700° C. Products of the reaction were then analyzed by gas chromatography and the ratio of reaction and the ratio of selectivity were calculated. The "ratio of reaction" is defined as (the amount of reacted methane/amount of supplied methane)×100 (%), and "selectivity" is defined as (amount of methane transformed to ethane and ethylene/amount of reacted methane)×100 (%).

As a result of the evaluation, the reaction vessels of Example 1, Comparative Example 1, and Example 2 all had a ratio of reaction equal to 5% and a selectivity equal to 90%, and ethane and ethylene were produced as products of the reaction. It was confirmed that making the volume of the source gas chamber relatively small had no effect on the ratio of reaction or selectivity.

While the present invention has been particularly shown and described with reference to the preferred mode as illustrated in the drawings, it will be understood by one skilled in the art that various changes in detail may be effected therein without departing from the spirit and scope of the invention as defined by the claims.

We claim:

1. A reaction vessel comprising an oxygen-containing gas chamber separated from a source gas chamber by an oxygen-permeable membrane that allows oxygen selectively to pass therethrough to contact and react with source gas contained in the source gas chamber, wherein the ratio of at least one of (i) the volume, $V_O$, of the oxygen-containing gas chamber to the total volume, $V_T$, of the vessel and (ii) the volume, $V_S$, of the source gas chamber to the total volume, $V_T$, of the vessel, is outside a range within which explosion would occur if the oxygen-containing gas and source gas were allowed to combine directly, and wherein the ratio of the volume of the oxygen-containing gas chamber to the volume of the overall vessel is 30% or less.

2. The reaction vessel of claim 1, wherein the ratio of the volume of the oxygen-containing gas chamber to The volume of the overall vessel is 10% or less.

3. The reaction vessel of claim 1, further comprising a filler disposed in at least one of the oxygen-containing gas chamber and the source gas chamber to reduce the volume of the respective chamber.

4. The reaction vessel of claim 3, wherein the filler is disposed in the oxygen-containing gas chamber and comprises a material that is inert to the oxygen-containing gas.

5. The reaction vessel of claim 4, wherein the filler comprises at least one material selected from the group consisting of metal, ceramic and glass.

6. The reaction vessel of claim 3, wherein the filler is disposed in the source gas chamber and comprises a material that is inert to the source gas.

7. The reaction vessel of claim 6, wherein the filler comprises at least one material selected from the group consisting of metal, ceramic and glass.

8. The reaction vessel of claim 1, wherein the ratio of at least one of (i) the volume, $V_O$, of the oxygen-containing gas chamber to the total volume, $V_T$, of the vessel and (ii) the volume, $V_S$, of the source gas chamber to the total volume, $V_T$, of the vessel, is outside a range within which explosion would occur if the oxygen-containing gas and products resulting from reactions between oxygen supplied through the oxygen-permeable membrane and the source gas were allowed to combine directly, and wherein the ratio of the volume of the oxygen-containing gas chamber to the volume of the overall vessel is 30% or less.

9. The reaction vessel of claim 1, wherein a volume ratio of the volume of the source gas chamber, $V_S$, to the total volume of the vessel, $V_T$, is greater than a threshold range explosion.

10. A reaction vessel comprising an oxygen-containing gas chamber separated from a source gas chamber by an oxygen-permeable membrane that allows oxygen selectively to pass therethrough to contact and react with source gas contained in the source gas chamber, wherein the ratio of at least one of (i) the volume, $V_O$, of the oxygen-containing gas chamber to the total volume, $V_T$, of the vessel and (ii) the vole, $V_S$, of the source gas chamber to the total volume, $V_T$, of the vessel, is outside a range within which explosion would occur if the oxygen-containing gas and products resulting from reactions between oxygen supplied through the oxygen-permeable membrane and the source gas were allowed to combine directly, and wherein the ratio of the volume of the oxygen-containing gas chamber to the volume of the overall vessel is 30% or less.

11. The reaction vessel of claim 10, wherein the ratio of the volume of the oxygen-containing gas chamber to the volume of the overall vessel is 10% or less.

12. The reaction vessel of claim 10, further comprising a filler disposed in at least one of the oxygen-containing gas chamber and the source gas chamber to reduce the volume of the respective chamber.

13. The reaction vessel of claim 12, wherein the filler is disposed in the oxygen-containing gas chamber and comprises a material that is inert to the oxygen-containing gas.

14. The reaction vessel of claim 13, wherein the filler comprises at least one material selected from the group consisting of metal, ceramic and glass.

15. The reaction vessel of claim 12, wherein the filler is disposed in the source gas chamber and comprises a material that is inert to the source gas.

16. The reaction vessel of claim 15, wherein the filler comprises at least one material selected from the group consisting of metal, ceramic and glass.

17. The reaction vessel of claim 10, wherein a volume ratio of the volume of the source gas chamber, $V_S$, to the total volume of the vessel, $V_T$, is greater than a threshold range of explosion.

* * * * *